(12) United States Patent
Johnen et al.

(10) Patent No.: US 8,464,807 B2
(45) Date of Patent: Jun. 18, 2013

(54) ELECTRICAL HAND TOOL WITH MAGNETS FOR ABSORBING DUST

(75) Inventors: Markus Johnen, Dettingen/Erms (DE); Wolfgang Stickel, Beuren (DE)

(73) Assignee: Metabowerke GmbH, Nuertingen (DE)

( * ) Notice: Subject to any disclaimer, the term of this patent is extended or adjusted under 35 U.S.C. 154(b) by 452 days.

(21) Appl. No.: 12/320,801

(22) Filed: Feb. 5, 2009

(65) Prior Publication Data
US 2009/0218113 A1 Sep. 3, 2009

(30) Foreign Application Priority Data
Feb. 28, 2008 (DE) .......................... 10 2008 011 589

(51) Int. Cl.
*E21B 4/04* (2006.01)
(52) U.S. Cl.
USPC .............................. 173/213; 173/217; 310/47
(58) Field of Classification Search
USPC ...................... 173/213, 217, 2; 310/56, 47, 88
See application file for complete search history.

(56) References Cited

U.S. PATENT DOCUMENTS

| | | | | |
|---|---|---|---|---|
| 1,972,315 A | * | 9/1934 | Ramey | 310/56 |
| 3,553,672 A | * | 1/1971 | Smith | 340/627 |
| 3,587,521 A | * | 6/1971 | Rubenstein et al. | 118/689 |
| 5,099,160 A | * | 3/1992 | Strozel et al. | 310/56 |
| 2005/0200215 A1 | * | 9/2005 | Oomori et al. | 310/88 |

FOREIGN PATENT DOCUMENTS

| | | |
|---|---|---|
| EP | 0 425 492 | 11/1993 |
| JP | 111 78282 | 7/1999 |
| WO | WO 2008/018611 | 2/2008 |
| WO | WO 2008018611 A1 * | 2/2008 |

\* cited by examiner

*Primary Examiner* — M. Alexandra Elve
*Assistant Examiner* — Nathaniel Chukwurah
(74) *Attorney, Agent, or Firm* — GrayRobinson, PA

(57) ABSTRACT

An electrical hand tool device comprises a ventilated housing body, which has inlet and outlet openings for cooling air flow and accommodates the electromotive components of the device, in particular, a motor that is excited by a permanent magnet and is powered by a battery, and a magnet that is provided in the area of the cooling air flow for collecting magnetic or magnetizable dust. In order to protect the electric motor, the device is designed in such a fashion that at least two magnets are provided in the axial direction between the inlet openings and the electromotive components of the device, and a means is provided, which electrically cooperates with the at least two magnets to determine whether a substantial amount of magnetizable dust has collected on the magnets, in which case, a control measure can be performed.

10 Claims, 2 Drawing Sheets

ELECTRICAL HAND TOOL WITH MAGNETS FOR ABSORBING DUST

CROSS REFERENCE TO RELATED APPLICATIONS

This application claims 35 U.S.C. §119(a) through (d) priority to DE 10 2008 011 589.4 filed Feb. 28, 2008 the complete disclosure of which is expressly incorporated herein by reference.

BACKGROUND OF THE INVENTION

The invention concerns an electrical hand tool device comprising a ventilated housing body, which has inlet and outlet openings for cooling air flow and accommodates the electromotive components of the device, in particular, a motor that is excited by a permanent magnet and powered by a rechargeable battery, and with a magnet that is disposed in the area of the cooling air flow for absorbing magnetic or magnetizable dust.

Electrical hand tool devices of this type are disclosed e.g. in EP 0 425 492 B1. This electrical hand tool device has an annular permanent magnet in the area of a gap between the rotor and the stator of the electric motor downstream of the electromotive components in the direction of the cooling air flow (on the downstream side), which is designed to prevent metal particles from entering this annular gap, where the magnetic field flux between the rotor and the stator is particularly large. The cooling air flow is otherwise guided through cooling air channels within the stator winding.

It is the underlying purpose of the present invention to further improve the protection of the electromotive components of an electrical hand tool device of this type, in particular, of an electrical hand tool device that is excited by a permanent magnet and is powered by a rechargeable battery. In particular, electric motors that are excited by a permanent magnet are particularly problematic in that, while working under extreme conditions (metal working, in particular in dockyards or with disintegrating processes, scrapping) magnetizable dust and particles can impair the efficiency of the electrical hand tool device.

SUMMARY OF THE INVENTION

In accordance with the invention, this object is achieved in an electrical hand tool device of the above-mentioned type in that at least two magnets are provided in the axial direction between the inlet openings and the electromotive components of the device, and a means is provided, which electrically cooperates with the at least two magnets and can determine whether a substantial amount of magnetizable dust has collected on the magnets and, if that is the case, a control measure can be taken.

Due to the fact that the magnets are disposed, with respect to the flow direction, upstream of the electromotive components of the device, the entire magnetizable particle dust that is carried along in the cooling air flow can be substantially retained to prevent it from loading the electromotive components. This provides particularly effective protection of the electromotive components. The invention is particularly advantageous for devices that are excited by a permanent magnet, in particular, rechargeable battery-powered devices, since these have a magnetic field not only during operation (which is generated by armature winding and stator winding only during operation), but have a permanent magnetic field in the area of the electromotive components from the permanent magnet. The magnetic or magnetizable dust that deposits at that location cannot be removed by the user, and, under extreme conditions, can even cause short-circuits within the device. The inventive arrangement of the dust collecting magnets in the flow direction upstream of the electromotive components prevents magnetic or magnetizable dust from even reaching the permanent magnets of the electric motor. In accordance with the further inventive idea, the means that electrically cooperates with the magnet determines whether a substantial amount of magnetizable particulate dust has already collected on the magnets. If this is the case, a control measure in the broadest sense is performed. This control measure may consist e.g. in that an optically and/or acoustically perceivable display signal is issued, or may even include automatic switching-off of the device. Towards this end, suitable display means or control means are provided with the purpose of informing the user that the dust collecting device formed by the magnets must be cleaned.

The above-mentioned means that electrically cooperates with the magnets may have any design. It is e.g. feasible to determine an amount of retained dust from the capacitance changes in the magnets. In accordance with a further advantageous embodiment of the invention, the means that electrically cooperates with the magnets can determine whether there is electric contact between the magnets. This electric contact is caused by increasing clogging of the magnets with magnetic or magnetizable dust leading to elongated bridges along the magnetic field lines between the magnets, which thereby also clog and block the flow path of the cooling air flow, thereby also endangering effective cooling of the electromotive components. The means that electrically cooperates with the magnets may thereby have a particularly simple design. It substantially only needs ohmic elements, and one can determine by suitable conventional electric or electronic means whether there is an electrically conducting connection between the magnets, which could only have been caused by retained particle dust.

It is e.g. feasible to position the dust collecting magnets in the vicinity of the air inlet openings, such that the dust can effectively be shaken out of the housing body for cleaning the magnets. Due to the magnetic effect of the dust collecting magnets, the housing body can advantageously be opened for cleaning the magnets. In another advantageous variant, the magnets can be removed from the housing body and be cleaned e.g. by means of a cloth.

The magnets are thereby advantageously disposed in the housing body in an insertion receptacle and can be removed along the insertion receptacle after opening the housing body.

In a further development of this inventive idea, the magnets are advantageously electrically contacted in a detachable fashion in their proper configuration within the housing body, in particular, loaded by a spring.

The, in particular, two and more magnets may basically have any design and position as long as they are disposed in the area of the cooling air flow between the air inlet openings and the electromotive components of the device, such that they substantially retain the overall magnetic or magnetizable particle dust from the cooling air flow. Towards this end, the magnets are advantageously curved, in particular like a shell, as viewed in cross-section perpendicularly to the longitudinal direction of the housing body. The magnets can thereby quasi surround a flow path of the cooling air flow from all sides in the peripheral direction. The dust is thereby retained with high efficiency.

Further features, details and advantages of the invention can be extracted from the enclosed claims, the drawing and the following description of a preferred embodiment of the invention. In the drawing:

DESCRIPTION OF THE PREFERRED EMBODIMENT

Figure 1:
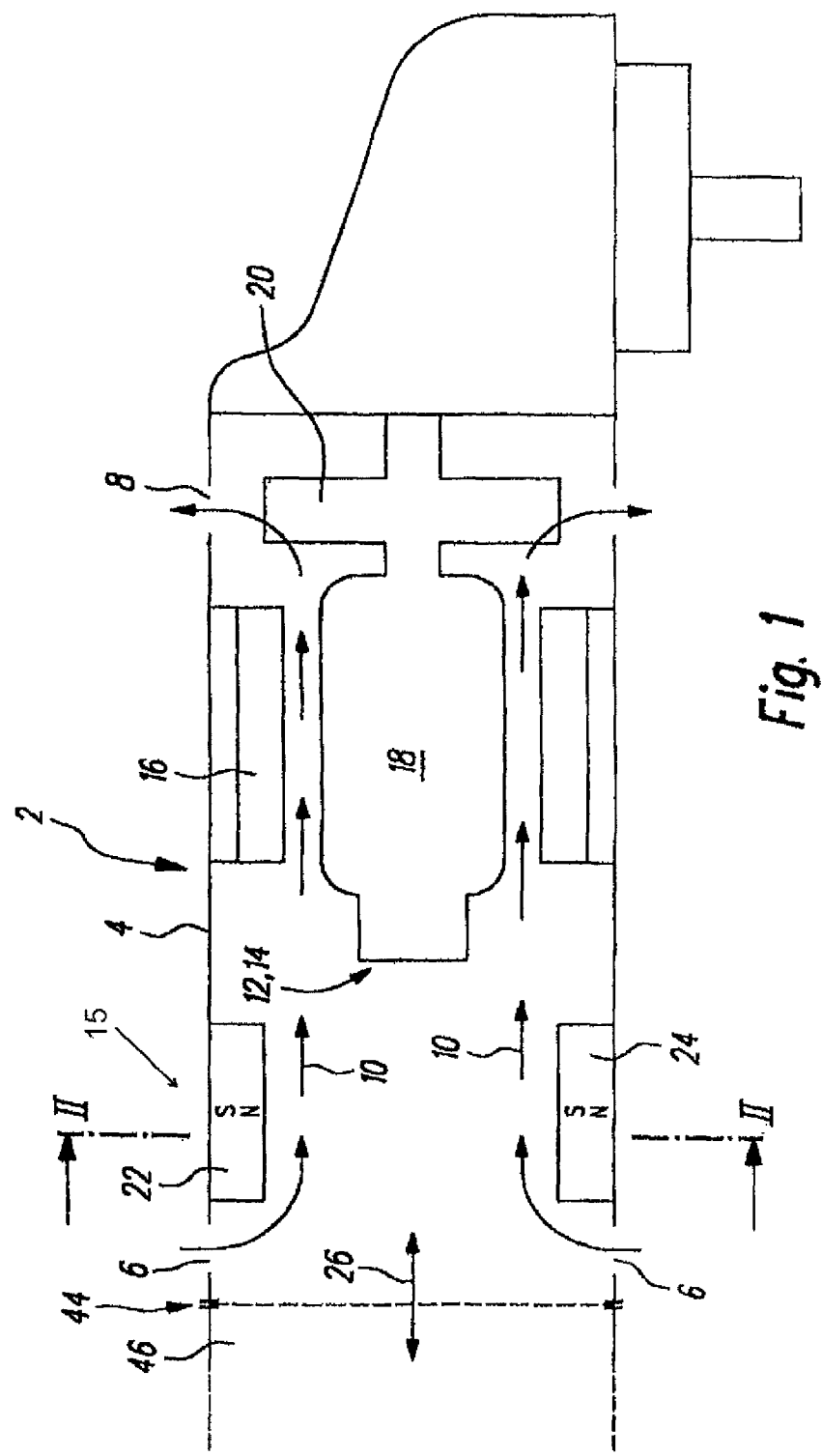
FIG. 1 shows a schematic view of an electrical hand tool device, in particular, in the form of a right angle grinder, for illustrating the arrangement of the magnets for retaining dust.

FIG. 1 schematically shows an electrical hand tool device 2, e.g. in the form of a right angle grinder, comprising a ventilated housing body 4 with inlet openings 6 and outlet openings 8 for cooling air flow that is indicated by arrows 10. Electromotive components 12 are also indicated, which, in the case that is illustrated by way of example, form a permanent magnetic and, in particular, battery-operated electric motor 14. It comprises a permanent magnetic stator 16 and an armature (rotor) 18. The armature 18 is connected to a radially displacing blower wheel 20 for secure rotation therewith, which provides ventilation during operation of the electrical hand tool device.

Figure 2:
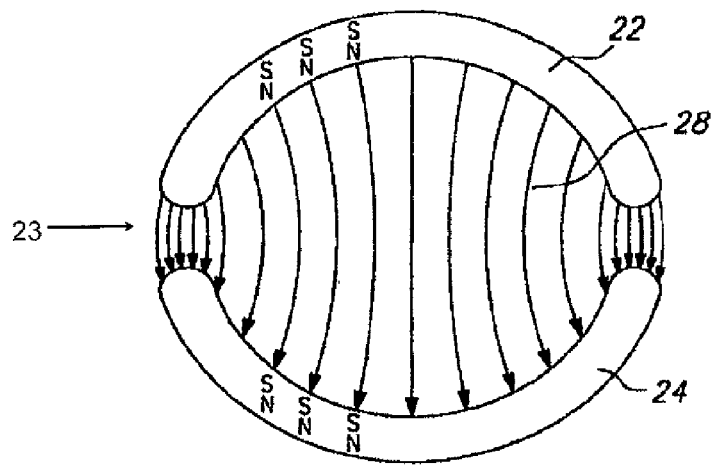
FIG. 2 shows a schematic sectional view through the electrical hand tool device according to FIG. 1 with intersecting plane II-II.
Figure 3A:
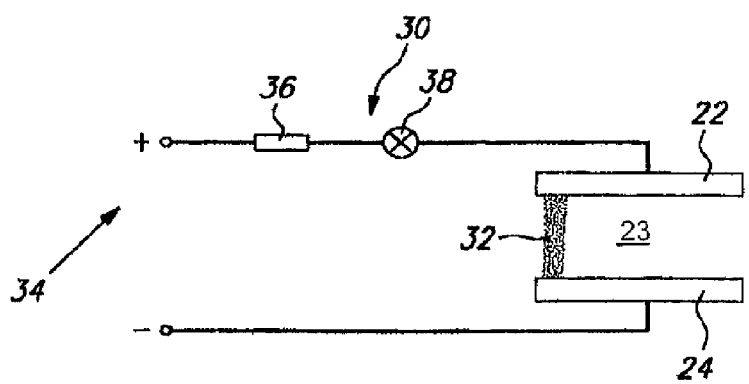
FIGS. 3a and 3b show a schematic illustration of an electric means that cooperates with the magnets.
Figure 3B:
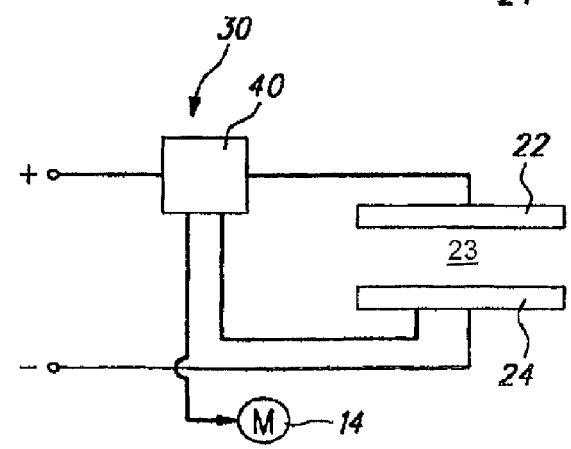

Two magnets 22, 24 are provided, with respect to the flow direction, upstream of the electromotive components 12 substantially immediately following the inlet openings 6, which, as shown in FIG. 2 are substantially "C"-shaped and are curved like a shell and extend substantially in the peripheral direction along the inner side of the housing body 4. These magnets 22, 24 are separated from one another by a gap 23 and generate a magnetic field 28 that extends across the flow path of air flow 10 at a location 15 located downstream of inlet openings 6 and upstream of motor 14 as shown in FIG. 1 and extends substantially in a plane perpendicularly to the longitudinal direction 26 of the housing body and to the direction of the cooling air flow (FIG. 2). The cooling air flow 10 flows through this magnetic field 28, wherein magnetic or magnetizable dust/particle dirt is deflected from the cooling air flow towards the magnets 22, 24 and fixed there. In this fashion, the dust particles do not load the electromotive components 12. As is also indicated in FIGS. 3a and 3b, the magnets 22 and 24 (and possibly further magnets) are contacted by a means that electrically cooperates with the magnets and is designated in total with reference numeral 30. This means 30 determines whether a substantial amount of magnetizable dust adheres to the magnets 22, 24. In particular, it can determine whether there is electric contact between the magnets 22, 24. When the amount of magnetic or magnetizable dust is such that an elongated bridge-like connection forms along the magnetic field lines of the magnetic field 28 due to the magnetic or magnetizable dust (indicated by reference numerals 32 in FIG. 3a), this electric contact can be easily determined by suitable electric or electronic means. FIG. 3a shows e.g. that the means 30 schematically comprises a voltage source 34, an ohmic resistance 36, and a lamp 38. When there is no electrically conducting connection between the magnets 22, 24, there is no current flow and the lamp 38 is not illuminated. As soon as the above-mentioned bridge-like connections 32 between the magnets 22 and 24 form, a current flows and the lamp 38 is illuminated. The illumination of the lamp 38 thereby represents a control measure, which informs the user that the dust collecting magnets 22, 24 have largely clogged and must be cleaned.

FIG. 3b schematically shows a control electronics 40 that can determine the loading state of the magnets 22, 24 with magnetic or magnetizable dust and carry out control measures in correspondence with predeterminable conditions. The control electronics 40 can e.g. take measures that directly interfere with the operation of the electrical hand tool device, e.g. switch off the electric motor 14, in addition to triggering optically and/or acoustically perceivable display signals.

FIG. 1 also merely schematically shows (at reference numeral 44 in FIG. 1) that a rear housing part 46 is designed to be removable in the longitudinal direction 26, such that a user gains access to the magnets 22, 24. The magnets 22, 24 are disposed e.g. in an insertion receptacle (not shown in detail), which extends in the longitudinal direction 26, in which they are also electrically contacted, in particular, in that the magnets can be removably attached to an electric contact e.g. a spring tab. Battery cells may also be accommodated in the rear housing part 46.

As soon as the electrically active means determines that a substantial amount of magnetic or magnetizable dust is present on the magnets 22, 24, and in particular, the free flow cross-section for the cooling air flow is reduced, a warning (acoustical and/or optical) is issued in accordance with an embodiment of the invention. The user is informed that he/she must clean the magnets 22, 24. Towards this end, he/she can remove the rear housing part 46 from the housing body 4 in the longitudinal direction 26 to gain access to the collecting magnets that can also be removed from the housing body 4 especially for this purpose. It is thereby ensured that the electrical hand tool device is not damaged or possibly destroyed even under extreme conditions.

We claim:

1. An electrical hand tool device of the type having a motor, said device comprising:
    a ventilated housing having an interior within which the motor is located so as to be exposed to an air flow along a flow path for cooling the motor, said flow path including at least one air inlet opening through which air of said air flow may enter said interior of said housing and at least one air outlet opening through which air of said air flow may exit said interior of said housing;
    at least two magnets which are separated from one another by at least one gap and are disposed within said housing to form a magnetic field extending across said flow path at a location located downstream of said inlet opening and upstream of the motor for collecting magnetically attractable particles from said air flow to prevent said particles from reaching the motor, said magnets being disposed such that all of said air flow passing through said flow path must pass between said magnets and through said magnetic field before reaching the motor; and
    means, cooperating with said at least two magnets, for determining whether a substantial amount of said particles has been collected by said magnets and for initiating at least one of: (i) an optically perceivable indication, (ii) an acoustically perceivable indication and (iii) de-energizing the motor.

2. An electrical hand tool device as claimed in claim 1, wherein said means determines whether there is electric contact between said magnets.

3. An electrical hand tool device as claimed in claim 1 wherein said control measure includes switching off the device.

4. An electrical hand tool device as claimed in claim 1, wherein said housing body can be opened for cleaning said magnets.

5. An electrical hand tool device as claimed in claim 1, wherein said magnets can be removed from said housing body.

6. An electrical hand tool device as claimed in claim 1, wherein said housing body includes an insertion receptacle within which said magnets are removably disposed such that said magnets can be removed from said insertion receptacle if said housing body is opened.

7. An electrical hand tool device as claimed in claim 6, wherein said magnets are loaded by a spring.

8. An electrical hand tool device as claimed in claim 1, wherein said magnets are substantially C-shaped, as viewed in cross-section, perpendicularly to a longitudinal direction of said housing body.

9. An electrical hand tool device as claimed in claim 1, wherein said magnets peripherally surround a portion of said flow path.

10. An electrical hand tool device as claimed in claim 1, wherein said means comprises a circuit.

* * * * *